United States Patent
French et al.

(10) Patent No.: US 9,578,923 B2
(45) Date of Patent: *Feb. 28, 2017

(54) ATHLETIC SHOE SOLE COATING FOR TRACTION ENHANCEMENT

(75) Inventors: Mark French, Larchmont, NY (US); Lucas James Tucker, Waterford, NY (US); Timothy Edward Banach, Scotia, NY (US)

(73) Assignee: Mission Product Holdings, Inc., N.Y., NY (US)

( * ) Notice: Subject to any disclaimer, the term of this patent is extended or adjusted under 35 U.S.C. 154(b) by 868 days.

This patent is subject to a terminal disclaimer.

(21) Appl. No.: 13/162,026

(22) Filed: Jun. 16, 2011

(65) Prior Publication Data
US 2011/0314706 A1    Dec. 29, 2011

Related U.S. Application Data

(60) Provisional application No. 61/358,553, filed on Jun. 25, 2010.

(51) Int. Cl.
| | |
|---|---|
| *C08L 77/00* | (2006.01) |
| *A43B 13/22* | (2006.01) |
| *C08L 23/08* | (2006.01) |
| *C09J 175/04* | (2006.01) |
| *C09J 193/04* | (2006.01) |
| *C08L 93/04* | (2006.01) |

(52) U.S. Cl.
CPC ............ *A43B 13/22* (2013.01); *C08L 23/0853* (2013.01); *C09J 175/04* (2013.01); *C09J 193/04* (2013.01); *C08G 2170/40* (2013.01); *C08L 77/00* (2013.01); *C08L 93/04* (2013.01); *C08L 2205/02* (2013.01)

(58) Field of Classification Search
CPC ...................................... A43B 13/22
USPC ........................................ 523/150
See application file for complete search history.

(56) References Cited

U.S. PATENT DOCUMENTS

| | | | | |
|---|---|---|---|---|
| 4,018,732 | A | * | 4/1977 | Lakshmanan .................. 524/270 |
| 5,686,179 | A | * | 11/1997 | Cotsakis et al. .............. 428/343 |
| 5,984,994 | A | * | 11/1999 | Hudson ............................. 71/28 |
| 6,805,954 | B2 | * | 10/2004 | Silverberg et al. ..... 428/355 AC |
| 7,109,257 | B2 | * | 9/2006 | Lorah et al. ................... 523/216 |
| 2012/0011749 | A1 | * | 1/2012 | French et al. ................. 36/59 R |

FOREIGN PATENT DOCUMENTS

| | | | |
|---|---|---|---|
| WO | WO9419414 | * | 9/1994 |
| WO | WO 2008006580 A2 | * | 1/2008 |

OTHER PUBLICATIONS

Flick, E.W. (1991). Industrial Synthetic Resins Handbook (2nd Edition). William Andrew Publishing/Noyes, Section IX. Phenolics. Online version available at: http://app.knovel.com/hotlink/toc/id:kpISRHE003/industrial-synthetic.*

* cited by examiner

*Primary Examiner* — Mark Eashoo
*Assistant Examiner* — Chelsea M Christensen
(74) *Attorney, Agent, or Firm* — Myron Greenspan; Lackenbach Siegel LLP

(57) ABSTRACT

An athletic shoe coating for traction enhancement includes a pressure sensitive adhesive (PSA) and a tackyfying resin and a film former initially in solution within a solvent suitable for application to the surface of a shoe sole in liquid form, such as by spraying, rolling and brushing the solution onto the shoe sole. After the solvent evaporates a film or coating attaches or is bonded to the shoe sole that exhibits the property of dynamically modifying the traction properties of the shoe sole when pressure and shear forces are applied to the coating. Such modification causes the exterior surface of the film or coating to "refresh" the exposed surface upon impact. This imparts continued tackiness over extended use. Impact modifiers may be added for controlled release of a solvent to temporarily dissolve or soften the film or coating to promote such refreshment of the coating outer surface.

17 Claims, No Drawings

ATHLETIC SHOE SOLE COATING FOR TRACTION ENHANCEMENT

CROSS-REFERENCE TO RELATED APPLICATION

This application is related to and claims priority of provisional Patent Application Ser. No. 61/358,553 filed on Jun. 25, 2010.

BACKGROUND OF THE INVENTION

1. Field of the Invention

The invention generally relates to athletic shoes and, more specifically, to a coating applied to the soles of athletic shoes for traction enhancement.

2. Description of the Prior Art

Specialized shoes have been designed and used in conjunction with many athletic activities, such as basketball, tennis, volleyball, etc. These shoes are designed not only to provide support to the player but to enhance the "cutability" performance of the shoes when a player is required to step "hard" on the shoes to stop quickly, pivot or reverse directions.

Indoor floor sport enthusiasts have one major complaint—dusty, dirty floor surfaces. Players use courts that range from slightly dusty to neglected for months. These conditions lead to a lack of traction at the most inopportune times, i.e., when turning suddenly or attempting to make fast cuts, initial accelerating steps and immediate stops.

Basketball and volleyball courts, for example, are hard surfaces that are generally maintained to provide very smooth surfaces. Such smooth hard surfaces when covered with dust tend to diminish the amount of traction that a shoe sole can provide, particularly when the bottom surface of the sole of the shoe becomes contaminated by collecting dust, fibers and other forms of debris. Such debris often sticks to the sole of a player's shoe and this diminishes and eventually leads to a significant reduction or loss of traction between the player's shoe sole and the floor surface. Such dust accumulates rather quickly in spite of all attempts to keep the floor dust free. Players often find it necessary to wipe the bottoms of their shoes quite frequently, with their hands or other devices in order to restore some of the original tackiness of their shoes.

A number of solutions for aforementioned problem have been proposed. U.S. Pat. No. 3,400,421, for example, discloses a shoe sole cleaner in a form of a "sticky" floor mat that incorporates a pressure sensitive adhesive (PSA) to accumulate dirt from the bottom of shoes. Once the sticky surface has been fully contaminated and can no longer adequately serve its purpose a new layer is created by peeling the top pressure sensitive sheet in a stack of such sheets. Thus, such shoe sole cleaner utilizes a pressure sensitive adhesive surface that a user can walk on to clean the under surface of shoes thereby removing some of the debris and micro-debris that has been accumulated and attached to the shoe sole. This is not always practical when playing sports.

U.S. Pat. No. 5,421,106 discloses a shoe sole wiping pad that seeks to eliminate the problem encountered on the floors of basketball courts and the like where there is a constant accumulation of dust particles that attach to the bottoms of shoes of basketball players, for example, resulting in loss of traction during a game. The patent discloses an upwardly facing wiping surface of suede or other suitable material that can be used by players to remove dust from their shoe soles by wiping the shoe soles on the upwardly facing surface of a shoe string cover mounted in each instep of each shoe.

In U.S. Pat. No. 5,555,564 an apparatus is disclosed for cleaning a shoe sole and a method of making and using the same. A shoe sole wiping pad is sewn into the outer surface of an athletic socks upper tube portion. The wiping pad absorbs and retains moisture and has a moisture-bearing wiping surface that removes dust and debris from the sole of an athletic shoe when the wearer wipes the sole across the pad.

In U.S. Pat. No. 7,337,561 a shoe sole traction enhancement device is disclosed intended to enhance the traction between a sole of a shoe and a hard court athletic surface. The patent discloses a number of different devices that include an adhesive roll that can be applied to the bottom surface of the shoe sole. The rolling process encourages the transfer of the particles from portions of the sole to the adhesive role, with the expectation that enough dust and debris is removed from the shoe sole to at least slightly enhance the traction between the shoe sole and the athletic surface.

In the aforementioned patents the emphasis is to apply a device to the shoe sole surface so that either rubbing the device against the shoe sole or the shoe sole rubbing against the device removes dust and/or other debris from the bottom of the shoe in order to restore some of the tackiness of the shoe sole. The problem with the proposed devices is that removing debris from the bottom of the shoe sole offers little to no added traction, beyond that of a clean shoe and lasts for only a short period of time. The sole will continue to attract dust and other debris that will stick to the shoe sole. With extended pounding the debris at least partially penetrates the surface of the sole and becomes embedded or lodged in the sole so that it is difficult to remove by physically rubbing the surface.

There are several products on the market today that attempt to address the issue of shoe adhesion including PYTHON™ solvent spray for shoe outsoles, SNEAKER GRIP™ spray for restoring flexibility of rubber outsoles, CRAMMERS ROSIN™ powdered rosin, B SHARP™ shoe sole cleaner for improving traction, SNEAKER GRIP SPRAY™ spray for restoring flexibility of rubber outsoles. SHOE GRIP™ spray-on adhesive to prevent slips and falls on ice and slippery surfaces, and SLIPP NOTT™ rubber and plastic mats for removing dust and dirt from athletic shoes in order to enhance traction and they can be broadly divided into two classes. The first are shoe-cleaning products, such as B SHARP™ which, while effective at cleaning, do not provide any modification of the shoe's original or current grip. Further, they are very short lived as they do not address the conditions of the court and as soon as the player takes a few steps all of the benefits of cleaning are lost. Watching any court event including basketball, volleyball, table tennis, squash, or racquetball games, as well as, cheerleading competitions one will notice players repeatedly wiping the soles of their shoes with their hands throughout the game. The second type of product attempts to modify the adhesion properties of the sole. There are far fewer of this type of product and those that exist are not designed for indoor use. Perhaps the most well-known is SHOE GRIP™, a product designed for outdoor adhesion between boots and cold surfaces. It employs a low melting point, room-temperature liquid rosin acid which, upon loss of the water (which requires at least 10 minutes), leaves behind a very sticky liquid rosin product. This is completely unacceptable for indoor athletic use as it would mar the floor and leave a sticky residue everywhere.

SUMMARY OF THE INVENTION

Accordingly, it is an object of the invention to provide an athletic shoe sole coating for enhancing traction on a smooth floor surface.

It is another object of the invention to provide an athletic shoe sole coating that can easily be applied in the form of a film to existing athletic shoe soles.

It is still another object of the invention to provide an athletic shoe sole coating that provides desired adhesion to any type of athletic shoe without excessive drag between the treated shoe and a smooth surface on which the shoe is used.

It is yet another object of the invention to provide an athletic shoe sole coating that provides desired tackiness and adhesion on a smooth floor surface at moments when a player using the treated shoes to quickly changes directions, starts, stops or pivots in place.

It is a further object of the invention as in the previous objects to provide an athletic shoe sole coating that does not leave undesired residues on the floor on which the shoes are used.

It is a further another object of the invention to provide an athletic shoe sole coating that does not require floor maintenance to address the use of the coating.

It is yet a further object of the invention to provide an athletic shoe sole coating that does not cause damage to the soles of the shoes to which the coating is applied.

It is still a further object of the invention to provide an athletic shoe sole coating as in the previous objects that is not a static coating but a dynamic coating that essentially refreshes itself by drawing in dust and micro-debris into the coating and effectively creates a new tacky surface with ongoing use during play over an extended period of time.

It is an additional object of the invention to provide an athletic shoe sole coating that can be applied to the sole of the shoe by any suitable delivery system such as spraying, rolling or brushing it onto a shoe sole.

It is still an additional object of the invention to provide an athletic shoe sole coating of the type under discussion that can incorporate impact modifiers to release a solvent or the like upon impact and application of pressure to the coating that essentially releases a controlled quantity of a solvent that effectively dissolves or softens the coating to allow molecular re-orientation to form new tacky surfaces as the shoe is used during play.

It is yet an additional object of the invention to provide an athletic shoe sole coating that, once it is applied by one of the aforementioned delivery systems, does not require additional devices for cleaning the shoe sole surfaces.

DESCRIPTION OF PREFERRED EMBODIMENT

An easily applied coating for athletic shoe soles has been formulated that provides better traction and grip for athletes on hard floor courts, such as basketball, volleyball and the like. This coating is intended to provide athletes improve turning, stopping, and reversing direction ability where the shoe soles of the player need to have a minimum level of tackiness to prevent slipping.

For purposes of the application the "cutability" or "cutting ability" of a shoe is the ability of the shoe soles to maintain a grip on a surface when a user rapidly changes direction, starts, stops, or pivots resulting in spikes in pressure applied to the shoe soles and normally requiring additional grip to prevent sliding on a smooth surface.

In order to achieve these and other features and benefits the athletic shoe sole coating of the present invention for enhancing traction is a formulation comprising a mixture of a film former, an adhesive and a tackifier in a state that can be applied to a surface by a suitable delivery mechanism. In the presently preferred embodiment the delivery system is a solvent within which the aforementioned components can be integrated into a liquid state. When applied to the shoe sole by spraying, rolling, brushing, wiping, pouring or dipping on the formulation, the solvent in which the aforementioned components are initially dissolved evaporates and leaves a thin film or coating that exhibits improved properties including initial tack and continuing tack when the sole has been exposed to contaminants. The initial solution can also include impact modifiers that release a controlled quantity of a solvent upon impact of the shoe sole on a hard surface to promote softening of the film and allow increased molecular re-orientation to thereby promote the continued generation of a tacky surface.

To address the requirements of this application it has been discovered that a mixture of three different components, in the right proportions and applied by a suitable delivery system or medium at the right coat weight can achieve all of the desired properties. The first component is a film forming polymeric material. Since "Shoe Grip" contains a low melting rosin because it is intended to be used on ice, it would be completely inappropriate for indoor sports use where ambient, controlled temperatures are typically above 65-70° F. Additionally, rapid play and local forces applied on certain areas of the shoe can provide localized heat that increases the temperature by an additional increment above the ambient temperature due to the rapid and continuous deformations of the shoe sole material from the pressures applied due to running and cutting. A higher melting rosin ester, therefore, is required to provide a film that adheres the active ingredients of the invention to the soles of the shoes. The use of this film prevents the final product from transferring and sticking to the court and causing issues with the floor itself. It also provides a way to adjust the product for seasonal variations in ambient use temperatures. Typically, the anticipated ambient temperatures operating range is 65-110° F. Since the shoe soles will tend to heat up and spike in temperature an incremental amount above ambient the melting points of the film former may be somewhat higher. Such adjustment can be achieved by appropriate selection of the "ring-and-ball" melting point of the film forming material to be within the range of 65-125° C. to correspond to anticipated user ambient temperatures. The "ring-and-ball" test, also known as "ball-and-ring" test, is a test for determining the melting point of asphalt, waxes, and paraffin in which a small ring is fitted with a test sample upon which a small ball is then placed; the melting point is that temperature at which the sample softens sufficiently to allow the ball to fall through the ring.

While the presently preferred film former is a rosin ester other polymers can be used. As indicated, the film former creates a film that incorporates the other active components and allows the active ingredients to controllably adhere to the soles of the shoes to which the composition is applied. The use of such a film prevents the final product from transferring and sticking to a playing court smooth surface and causing issues with the floor itself. Numerous film formers can be used including polymers selected from the following group: synthetic polymers, polyethylene-co-vinyl acetate, polyesters, polyacrylates, and natural resinous materials and resin derivatives.

The second component is a tackifing resin which gives the film its ability to stick to the court. Though there are many different types of tackifiers (e.g., hydrocarbon resins, rosin derivatives, alkylphenolic resins, terpene phenolics; polyterpenes, modified alkylphenolic resins and coumarone indene resins. The tackifier may be prepared from p-tert-octylphenol.) One type (phenolic resins) appeared to be most effective in this application. Surprisingly, there was even quite a difference in performance among the different types of phenolic resins.

The third component is an adhesive resin. The use of an adhesive to make two surfaces stick to one another is not remarkable; however, we have discovered that the use of pressure sensitive adhesives imparts the desired shear sensitivity to the final film. Adhesives may be selected from the following group: polyurethanes, polyesters, polyacrylates and polyamides. In particular, acrylic pressure sensitive adhesives are particularly effective within this formula such as acrylic pressure sensitive adhesive resins. Such PSA adhesives can also include acrylic hot melt adhesives.

The three primary active components are solids and a suitable delivery system must be employed to separate the particles and cause them to stick or bond to a shoe sole surface. A presently preferred delivery component is a suitable solvent that is effective to separate the active particles from each other and facilitates their application to a surface such as a shoe sole. All three active components exhibit some stickiness and a suitable solvent is one that is effective to dissolve all three and upon rapid drying leave behind a uniform film. Thus, when using active ingredients that are organic an organic solvent should be like. Likewise, when water soluble active ingredients are used a water soluble solvent should be used and, in some instances even water may be used as the delivery system. Urethane, polyurethane and EVA (polyethylene-co-vinyl acetate) are other examples of water soluble adhesives that may be used. Effective solvents can include aromatic hydrocarbons (toluene), ketones (acetone), alcohols (isopropyl alcohol), non-voc natural solvents, esters and ethers.

It has been found that a composition or formulation of a film former, an adhesive and a tackifier resin suspended in a volatile solvent, such as acetone, allows the composition to be easily applied to the bottom of shoe sole, by spraying, rolling or brushing the composition onto the shoe sole.

It has been found that a film former, such as any suitable rosin ester may be used. However, any film former that promotes the creation of a thin film can also be used, with different degrees of advantage.

The use of an adhesive and a tackifier has been found to provide a better result than the use of an adhesive or a tackifier alone. Thus, an adhesive, such as an acrylic pressure sensitive adhesive (PSA) e.g. an acrylic PSA, and tackifier resin (e.g. phenolic tackifying resin) readily dissolves in acetone to provide an easy to apply coating. The coating shows improved properties over any of the ingredients individually or even mixtures of the rosin with either of the other components.

While the mixture or formulation utilizes components that are readily dissolved in the solvent acetone it should be evident to those skilled in the art that other solvents may work best with other film formers, adhesives and/or tackifier resins. However, regardless of the solvent used it has been found that an adhesive used together with a tackifier resin provides the desired results when incorporated in a film former. In this connection, any film former may be used that promotes the creation of thin, continuous films that anchor or bond well to the shoe sole surface.

A solution that has been found to provide desirable properties includes a solution of 85-96% acetone, 2-10% film former, with the remaining 2-5% comprising the adhesive and the tackifier resin. In the embodiment being described the film former is a rosin ester, the adhesive is an acrylic pressure sensitive adhesive (PSA), the tackifier resin is a phenolic tackifying resin. After the acetone has evaporated, the resulting film comprises approximately 70-80% film former, and approximately 20-30% adhesive and tackifier resin. The indicated quantities of the solvent, film former, adhesive and tackifier can be modified relative to each other with different degrees of advantage. However, the initial composition, prior to evaporation of the solvent or acetone, should include the film former at less than 25% and the adhesive and tackifier resin together should preferably be less than 10%.

By utilizing an adhesive and a tackifier resin in relatively small proportions compared to the film former material, relatively mild but adequate levels of adhesion and tack are provided. The ratios of adhesive and tackifier resins can be adjusted or modified relative to each other although they should remain relatively fixed in relation to the percentage of film former that is used.

An effective composition for imparting tackiness to a shoe sole surface includes a film former such as Sylvalite™ RE 100, an adhesive that is a mixture of Acrynax 4326 and Acrynax 11891 and a tackifier such as SP-1068 mixed in the respective relative proportions 12.5:0.55:0.71:3.75.

In accordance with a further embodiment of the invention, impact modifiers may be added to the solution or composition that contain and release solvent in controlled amounts upon impact, temporarily effectively dissolving or softening the film former material and allowing the molecules of the composition to re-orient themselves to effectively continuously create new and effective tacky surfaces, to prevent accumulation of dust and other micro-debris that reduce traction. The film former, therefore, preferably adheres to the shoe sole surface but is capable of dissolving or softening upon impact or pressure applied to the film or coating to effectively refresh the coating and maintain it in a tacky state when the coating is exposed to significant shear forces. Impact modifiers normally include nano-sized particles comprising organic emulsion polymerized cross-linked polymers and synthetic inorganic clay.

A good or strong PSA adhesive could permanently stick to a surface, defeating the object of the invention. Using a weak or poor PSA adhesive provides the necessary grip without excessive adhesion to the surface and, therefore, drag on the user that may slow and wear the user down. It is necessary, therefore, to balance cutability and drag and this is achieved by maintaining the discussed ratios before and after the solvent has evaporated.

A series of formulations have been tested for both initial tack and repeating tack between either stainless steel or finished hardwood flooring and cured styrene-butadine or styrene-butadine rubber (SBR). These formulations were prepared as dilute (10-20 wt %) acetone solutions and equivalent 0.022 mL aliquots were applied to the non-rubber substrate for testing. The applied coating was given sufficient time to dry before rubber strips (ca. 1" by 2") were applied to the coatings with mild finger pressure. Each test sample was then removed via a "t-peel" in turn and judged for initial tack. After rankings were assigned the samples were tested for repeat tack whereby they were pressed to the coating with finger pressure and then removed quickly. This process was repeated until it was judged that there was no tack remaining. All tests were performed on fresh samples by two different testers and the results were consistent.

Specific Examples of Compositions and Test Results

In the Tables presented below references are made to the following active components or materials.

Material Listing

| Active Component | Chemical Name | Supplier |
|---|---|---|
| Tack 1 | SP-1068 | SI Group Inc. |
| Adhesive 1 | Acrynax - 4326 | Franklin Adhesives & Polymers |
| Adhesive 2 | Acrynax - 11891 | Franklin Adhesives & Polymers |
| Adhesive 3 | EVA | Exxon Mobile |
| Film Former 1 | Sylvatac ™ RE 98* | Arizona Chemical |
| Film Former 2 | Sylvatac ™ RE 85* | Arizona Chemical |
| XTR | Elsol - XTR | VertecBio ™ |
| AR | Elsol - AR | VertecBio ™ |
| EXL 2335 | Paraloid ™ EXL 2335 | Dow |
| KM 330 | Paraloid ™ KM 330 | Dow |
| KM 4400 | Paraloid ™ KM 4400 | Dow |
| AL-2425 | AL-2425 | Nanoarc ® AL-2425 |
| SP 560 | SP 560 | SI Group Inc. |
| Escorez 1105 | Escorez 1105 | Exxon Mobile |
| Koresin | Koresin ® | BASF Group |
| T-6000 | Elaztobond ® T-6000 | SI Group Inc. |
| T-5600 | Elaztobond ® T-5600 | SI Group Inc. |
| T-3100 | Elaztobond ® T-3100 | SI Group Inc. |

The Sylvatac™ product line has been replaced by the Sylvalite™ product line.

The following Table identifies the companies that supply each of the active components or materials used in the specific examples given.

Supplier Listings

| | |
|---|---|
| SI Group Inc. | 2750 Balltown road Schenectady NY 12309 |
| Franklin Adhesives & Polymers | 2020 Bruck Street Columbus OH 43207 |
| Exxon Mobil | 5959 Las Colinas Boulevard Irving TX 75039 |
| Arizona Chemical | 4600 Touchton Road East Suite 1200 Jacksonnville FL 32246 |
| VertecBio ™ | 1441 Branding Lane Suite 100 Downers Grove, IL 60515 |
| Dow | 2030 Dow Center Midland, Michigan 48674 |
| Nanoarc ® AL-2425 | 1319 Marquette Drive Romeoville IL 60446 |
| BASF Group | 100 Campus Drive Florham Park NJ 07932 |

Testing was performed on a local amateur basketball court employing experienced basketball players who ran through a defined set of turns forwards and backwards multiple times. After each series of three loops the players rated the test material on four criteria: (1) Initial Grip, (2) Cutting ability, (3) Noise, and (4) the sustained duration of the grip. All four are desired properties for a good product. "Initial grip" is a measure of the level of grip the player experienced in the first few steps of the trial. "Cutting" refers to the grip experienced when making rapid changes in direction or stopping and starting. "Noise" refers to the amount of squeaking a product produced during the test. Finally, "Duration" or continuity of the grip is a measure of how well the grip was retained throughout the test, independent of the initial level. Typically, it is useful for the coating to remain effective at least between breaks in play (e.g. "time outs", quarters, etc.) when a user can, if necessary, re-apply a new coating. Thus a Composition ("C") could have a low initial grip but a high mark for duration if the grip was not lost over the course of the test. Additionally, shoe soles were inspected for buildup and marring after each trial and noted appropriately. The surface of the court was also monitored for formulas that lead to transfer and marring of the floor.

Compositions were judged on a 1, 3, 9 scale with one being comparable to a clean shoe, 3 having a measurable effect and 9 being significantly more noticeable. A score of 9 is not necessarily the best possible score for noise. A score of 9 (most noticeable) on the noise scale was in early testing often accompanied by remarks that the noise detracted from the product, as it sounded sticky in a negative way. However, in later tests on better formulations a score of 9 could represent excellent squeaking that the testers associate with good grip. In each set of Tables below the first Table (1A) refers to relative concentrations of each component while the second Table (1B) sets forth the responses of one tester when possible. Multiple testers were used but given the nature of human testing it is difficult to make precise analysis of the grouped data; therefore for each comparison only one tester is reported for consistency.

Tables 1A and 1B compare samples of compositions or mixtures C-9, C-13 and C-15 to C-19. Using a film former alone (C-9) provides some initial grip but gets low grades for cutability and no maintenance of the grip with time. Using a tackifier alone (C-13) provides good initial grip and cutability but has poor maintenance of grip and poor mark for noise. Using adhesive alone (C-15) had good initial properties but resulted in too much noise and also led to significant dirt accumulation on the soles of the shoes. The mixtures of film former and either one of tack or adhesive (C-10, C-11, C-12) provided some good properties but all two component mixtures suffered from a lack of retention of properties. A mixture of tack and adhesive (C-16) received good grades for grip and cutability but was very noisy and had dirt pick up. The mixture of all three (C-19) in relative proportions to provide a ratio of 0.5 as discussed above, while not perfect by scoring, gave sufficient grip and cutability that stayed constant throughout the entire test. Noise was acceptable and consistent.

TABLE 1A

Amounts of Each Component for Mixture

| | C-9 | C-10 | C-11 | C-12 | C-13 | C-15 | C-16 | C-19 |
|---|---|---|---|---|---|---|---|---|
| Tack 1 | | 0.375 | | | 1.5 | | 0.75 | 0.625 |
| Adhesive 1 | | | 0.335 | | | | 0.699 | 0.112 |
| Adhesive 2 | | | | 0.431 | | 1.435 | | |
| Film Former 1 | 1.5 | 1.25 | 1.25 | 2.5 | | | | 0.75 |

TABLE 1B

Test Results for Mixture

| Tester | Composition | Initial Grip | Noise | Cutability | Cont. Grip |
|---|---|---|---|---|---|
| Tester M | C-9 | 3 | 9 | 3 | 1 |
| Tester M | C-10 | 9 | 3 | 9 | 3 |
| Tester M | C-11 | 9 | 3 | 9 | 3 |
| Tester M | C-12 | 9 | 3 | 3 | 3 |
| Tester M | C-13 | 3 | 1 | 3 | 3 |
| Tester M | C-15 | 9 | 9 | 9 | 3 |
| Tester M | C-16 | 9 | 9 | 9 | 9 |
| Tester M | C-19 | 3 | 1 | 3 | 9 |

In Table 2A, the testing was done static in a laboratory where two testers (testers "T" and "L") tested eight samples at a time and ranked them for either initial grip or continued grip (judged by the number of applications that maintained some grip.) The test consisted of applying a measured amount of sample to a piece of hard wood flooring which was then allowed to dry. A piece of EVA rubber (the same durometer as sneaker sole material) was then applied by finger and removed.

The results for initial grip show that the best results were with a mixture of film former, adhesive and tackifier. Additionally increasing the amount of film former (the last four entries) was less effective overall than the lower concentration independent of the rest of the formulation. The results for continued grip show the same pattern, thus a mixture of all three components was judged the best for initial and continued grip.

TABLE 2A

Film Formers

| | |
|---|---|
| C3-1 | 10% Film Former 1, 1% Adhesive 1, 1% Tack 1 |
| C3-3 | 10% Film Former 1, 1% Adhesive 1, 3% Tack 1 |
| C4-2 | 10% Film Former 2, 3% Adhesive 1, 1% Tack 1 |
| C4-4 | 10% Film Former 2, 3% Adhesive 1, 3% Tack 1 |
| C6-1 | 20% Film Former 1, 20% Tack 1 |
| C6-2 | 20% Film Former 1, 4% Tack 1 |
| C5-5 | 20% Film Former 1, 20% Adhesive 1 |
| C5-6 | 20% Film Former 1, 4% Adhesive 1 |

TABLE 2B

Film Formers Results for Initial Grip

| ID | TESTER T | TESTER L | SUM | RANK |
|---|---|---|---|---|
| C3-1 | 1 | 1 | 2 | 1 |
| C3-3 | 2 | 2 | 4 | 2 |
| C4-2 | 7 | 6 | 13 | 7 |
| C4-4 | 7 | 8 | 15 | 8 |
| C6-1 | 4 | 5 | 9 | 4 |
| C6-2 | 3 | 3 | 6 | 3 |
| C5-5 | 5 | 8 | 13 | 6 |
| C5-6 | 8 | 4 | 12 | 5 |

TABLE 2C

Film Formers Results for Continued Grip

| ID | TESTER T | TESTER L | SUM | RANK |
|---|---|---|---|---|
| C3-1 | 3 | 1 | 4 | 1 |
| C3-3 | 5 | 2 | 7 | 3 |
| C4-2 | 7 | 5 | 12 | 7 |
| C4-4 | 8 | 8 | 16 | 8 |
| C6-1 | 2 | 6 | 8 | 4 |
| C6-2 | 1 | 4 | 5 | 2 |
| C5-5 | 4 | 7 | 11 | 6 |
| C5-6 | 6 | 3 | 9 | 5 |

In Table 3A a series of different phenolic tackifiers were tested for efficacy. These tackifiers vary widely in the type of alkylphenol they are prepared from (p-tert-Octylphenol—SP-1077, T-6000 vs. p-tert-butylphenol-T-3100, Koresin® or a mixture of the two T-5600) and in the type of modification they have to the resin (SP-1077=epoxy, T-6000=vinyl, T-3100 epoxy+amine.) The results in Table 3B show that there are significant differences in performance between the different types; however, the differences do not follow any specific pattern of benefits or results (e.g., alkyphenol type.) This demonstrates that the results are not a function of tackifier type when the proportions of the active components are maintained.

TABLE 3A

Addition of Various Tackifier Types to the Mixture

| | C-80 | C-81 | C-82 | C-83 | C-84 |
|---|---|---|---|---|---|
| SP-1077 | 0.375 | | | | |
| T-6000 | | 0.375 | | | |
| T-3100 | | | 0.375 | | |
| T-5600 | | | | 0.375 | |
| Koresin ® | | | | | 0.375 |
| A4326 | 0.056 | 0.056 | 0.056 | 0.056 | 0.056 |
| A11891 | 0.072 | 0.072 | 0.072 | 0.072 | 0.072 |
| RE98 | 1.25 | 1.25 | 1.25 | 1.25 | 1.25 |

TABLE 3B

Tackifier Types Results

| Tester | Composition | Initial Grip | Noise | Cutability | Cont. Grip |
|---|---|---|---|---|---|
| Tester R | C-80 | 9 | 9 | 9 | 3 |
| Tester R | C-81 | 9 | 3 | 3 | 3 |
| Tester R | C-82 | 9 | 9 | 9 | 3 |
| Tester R | C-83 | 3 | 3 | 3 | 1 |
| Tester R | C-84 | 3 | 3 | 3 | 9 |

In Table 4A compare Compositions C-3 and C-7 to see that the type of acrylic adhesive leads to different properties. One gives better noise performance and the other better cutability. Surprisingly an approximately one to one mixture of the two (composition 22) resulted in the best continued grip of all of the compositions. The 80:20 mixtures in either proportion were less effective than 50:50. Composition 104 demonstrates that other types of adhesives (Adhesive 3, which is EVA based) can also provide acceptable results and thus the use of many different types of adhesives should work. Table 4B shows that at higher loading of the tackifier the results for adhesives is somewhat different. Here a single tackifier (test 19) gave the best overall performance. This again demonstrates that there are several options for formulating this product.

TABLE 4A

Mixtures with Various Ratios of Adhesives.

| | C-104 | C-3 | C-7 | C-22 | C-24 | C-25 |
|---|---|---|---|---|---|---|
| Tack 1 | 0.375 | 0.375 | 0.375 | 0.375 | 0.375 | 0.375 |
| Adhesive 1 | | 0.112 | | 0.056 | 0.022 | 0.0892 |
| Adhesive 2 | | | 0.335 | 0.072 | 0.115 | 0.0287 |
| Film Former 1 | 1.25 | 1.25 | 1.25 | 1.25 | 1.25 | 1.25 |
| Adhesive 3 | 0.055 | | | | | |

TABLE 4B

Adhesive Test Results

| | Composition | Initial Grip | Noise | Cutability | Cont. Grip |
|---|---|---|---|---|---|
| Tester M | C-3 | 3 | 1 | 3 | 3 |
| Tester M | C-7 | 3 | 0 | 9 | 3 |
| Tester M | C-22 | 3 | 1 | 3 | 9 |
| Tester M | C-24 | 3 | 3 | 3 | 3 |
| Tester M | C-25 | 3 | 3 | 3 | 3 |
| Tester K | C-104 | 9 | 1 | 3 | 3 |

Table 5 demonstrates that several different solvents can be used to prepare the product which should not be limited to those tested. Not all have the same performance results, but all provide some level of desirability. These solvents represent ketone (acetone), alcohol (IPA), environmentally friendly version of acetone (natural ester/alcohol mixture ATR) and a higher-boiling environmentally friendly solvent (XTR).

TABLE 5

Mixtures Dissolved in Various Solvents

| Tester | Solvent | Initial Grip | Noise | Cutability | Cont. Grip |
|---|---|---|---|---|---|
| Tester K | Acetone | 9 | 9 | 9 | 9 |
| Tester K | Acetone | 9 | 9 | 3 | 3 |
| Tester K | XTR | 9 | 1 | 9 | 3 |
| Tester K | ATR | 9 | 1 | 3 | 1 |
| Tester K | IPA | 9 | 1 | 3 | 3 |

Table 6A contains two sets of data regarding the final dosing of product for efficacy. The first four compositions (C-22, C-37, C-39, C-41) were a wide-range screen for the proper concentrations of product. Concentration controls final coat weight on the shoe as a set amount is applied in each test. Thus, higher concentrations put a thicker coating on the shoe and vice versa. The best results, seen in Table 6B, appear to fall in the range of 10-20% of the initial concentration. The second sets of tests were used to focus in on that range and to see where the best concentration was. Here the results show that the 17% concentration was the best. Though 33% had similar rankings, some testers did not like it as well, feeling that it had too much grip at times.

TABLE 6A

Concentration Effect: Amounts of Each Component

| | C-22 | C-37 | C-39 | C-41 | C-59 | C-60 | C-61 | C-62 | C-63 |
|---|---|---|---|---|---|---|---|---|---|
| Tack 1 | 0.37 | 0.037 | 0.0037 | 0.074 | 0.024 | 0.031 | 0.041 | 0.063 | 0.122 |
| Adhesive 1 | 0.05 | 0.006 | 0.0006 | 0.011 | 0.040 | 0.050 | 0.066 | 0.010 | 0.020 |
| Adhesive 2 | 0.07 | 0.007 | 0.0007 | 0.014 | 0.005 | 0.006 | 0.008 | 0.012 | 0.023 |
| Film Former 1 | 1.25 | 0.125 | 0.0125 | 0.250 | 0.084 | 0.104 | 0.138 | 0.213 | 0.413 |
| %22 | | 10% | 1% | 20% | 6.7% | 8.3% | 11% | 17% | 33% |

TABLE 6B

Concentration Effect: Testing Results

| Tester | Composition | Initial | Noise | Cutability | Cont. Grip |
|---|---|---|---|---|---|
| Tester M | C-22 | 3 | 9 | 3 | 3 |
| Tester M | C-37 | 3 | 9 | 3 | 9 |
| Tester M | C-39 | 3 | 9 | 3 | 3 |
| Tester M | C-41 | 3 | 3 | 3 | 9 |
| Tester K | C-59 | 1 | 1 | 1 | 1 |
| Tester K | C-60 | 1 | 1 | 3 | 3 |
| Tester K | C-61 | 9 | 1 | 3 | 3 |
| Tester K | C-62 | 9 | 3 | 9 | 3 |
| Tester K | C-63 | 9 | 3 | 9 | 3 |

Tables 7A and 7B deal with the addition of nano-sized particles to the composition such that they were 0.1% of solids. These particles were of two types: EXL and KM were organic emulsion polymerized crosslinked polymers while AL-2425 was a type of synthetic inorganic clay. Both types can be added to the product successfully to the compositions (compositions C-33 and C-42) to impart better continued grip.

TABLE 7A

Mixtures with Various Nano Additives

| | C-19 | C-31 | C-33 | C-34 | C-42 |
|---|---|---|---|---|---|
| Tack 1 | 0.625 | 0.625 | 0.625 | 0.625 | 0.625 |
| Adhesive 1 | 0.112 | 0.112 | 0.112 | 0.112 | 0.112 |
| Adhesive 2 | | | | | |
| Film Former 1 | 0.75 | 0.75 | 0.75 | 0.75 | 0.75 |
| Nano | | Exl2335 | KM330 | KM4400 | AL-2425 |

TABLE 7B

Nano Additive Results

| Tester | Composition | Initial Grip | Noise | Cutability | Cont. Grip |
|---|---|---|---|---|---|
| Tester M | C-19 | 9 | 9 | 9 | 3 |
| Tester M | C-31 | 3 | 3 | 9 | 3 |
| Tester M | C-33 | 3 | 9 | 3 | 9 |
| Tester M | C-34 | 9 | 9 | 9 | 3 |
| Tester M | C-42 | 3 | 3 | 3 | 9 |

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What claimed is:

1. A composition for imparting tackiness to a shoe sole surface comprising:
   a film former;
   an adhesive other than said film former;
   a tackifier; and
   a solvent capable of dissolving and creating a substantially uniform solution of said film former, adhesive and tackifier suitable for application as a coating to a shoe sole surface, said film former being greater than 65% by weight in a mixture of said film former, adhesive and tackifier after evaporation of said solvent thereby forming a film when applied to a surface and having a liquid-glass transition temperature $T_g$ greater than the anticipated use temperatures within the range of 65-110° F. after application to a surface and evaporation of said solvent, the film produced exhibiting a tackiness property only when exposed to shear forces that elevate the temperature of the applied composition at least to the temperature $T_g$, wherein said film former has a softening point above 100° C., said adhesive comprises at least two polymers one polymer having a ball and ring melting point within the range of 70-80°

C. and another polymer having a ball and ring melting point within the range of 100°-115° C., and said tackifier comprises a resin having a ball and ring softening temperature within the range of 85°-95° C.

2. A composition for imparting tackiness to a shoe sole surface as defined in claim 1, wherein said film former is a polymeric material.

3. A composition for imparting tackiness to a shoe sole surface as defined in claim 1, wherein said film former has a "ball and ring" softening point selected to be within a temperature range of 65-125 C.°.

4. A composition for imparting tackiness to a shoe sole surface as defined in claim 1, wherein the shoe sole is made of a predetermined material, and said film former is selected to adhere the composition to said predetermined material.

5. A composition for imparting tackiness to a shoe sole surface as defined in claim 1, wherein said adhesive is a pressure sensitive adhesive (PSA).

6. A composition for imparting tackiness to a shoe sole surface as defined in claim 1, wherein said at least two polymers are acrylic polymers.

7. A composition for imparting tackiness to a shoe sole surface as defined in claim 1, wherein said adhesive is a pressure-sensitive adhesive.

8. A composition for imparting tackiness to a shoe sole surface as defined in claim 1, wherein said tackifier is selected from a group consisting of hydrocarbon resins, rosin derivatives, coumarone indene resins, alkylphenolic resins, terpene phenolics, modified alkylphenolic resins, para-tert-butylphenol acetylene copolymer CAS#28514-92-3 and polyterpenes.

9. A composition for imparting tackiness to a shoe sole surface as defined in claim 1, wherein said tackifier is prepared from p-tert-octylphenol.

10. A composition for imparting tackiness to a shoe sole surface as defined in claim 1, wherein said film former comprises a rosin ester.

11. A composition for imparting tackiness to a shoe sole surface as defined in claim 1, wherein said composition comprises, by mass, a solution of greater than 85% solvent, 2-10% film former, and the remaining 2-5% said adhesive and tackifier.

12. A composition for imparting tackiness to a shoe sole surface as defined in claim 1, wherein said solvent is selected from a group consisting of a esters, ethers, ketones, alcohols, natural ester/alcohol mixtures, and aromatic hydrocarbons.

13. A composition for imparting tackiness to a shoe sole surface as defined in claim 1, further comprising nano-sized particles comprising organic emulsion polymerized cross-linked polymers.

14. A composition for imparting tackiness to a shoe sole surface as defined in claim 1, further comprising nano-sized particles comprising synthetic inorganic clay.

15. A composition as defined in claim 1, wherein said film former, first and second solid acrylic polymers forming said adhesive and said tackifier are mixed in the respective relative proportions 12.5:0.55:0.71:3.75.

16. A method of increasing selective tackiness to a bottom surface of a shoe sole comprising the step of applying a coating on the surface of the shoe sole; the coating or film being formed by dissolving into a solution a mixture of a film former;
 an adhesive other than said film former;
 a tackifier; and
 a solvent capable of dissolving and creating a substantially uniform solution of said film former, adhesive and tackifier suitable for application as a coating to a shoe sole surface; and
applying a coating of said solution on a surface to evaporate said solvent to create a film, said film former being greater than 65% by weight in a mixture of said film former, adhesive and tackifier after evaporation of said solvent and having a liquid-glass transition temperature $T_g$ greater than the anticipated use temperatures within the range of 65-110° F. after application to a surface and evaporation of said solvent, the film produced exhibiting a tackiness property only when exposed to shear forces that elevate the temperature of the applied composition at least to the temperature $T_g$, wherein said film former has a softening point above 100° C., said adhesive comprises a mixture of at least two polymers, one polymer having a ball and ring melting point within the range of 70-80° C. and another polymer has a ball and ring melting point within the range of 100°-115° C. and said tackifier comprises a resin having a ball and ring softening temperature within the range of 85°-95° C.

17. A method as described in claim 16, further comprising the step of adding, during the dissolving step, nano-sized particles comprising organic emulsion polymerized cross-linked polymer that serve as impact modifiers for selectively softening said composition and rendering said layer tacky.

* * * * *